United States Patent [19]

Melchiorre et al.

[11] 3,915,293
[45] Oct. 28, 1975

[54] ARTICLE LOADING APPARATUS

[75] Inventors: Vincent J. Melchiorre, Derwood; Romualdas K. Gruodis, Mount Airy, both of Md.

[73] Assignee: Fairchild Industries, Inc., Germantown, Md.

[22] Filed: Feb. 15, 1974

[21] Appl. No.: 442,839

[52] U.S. Cl. ................. 198/245; 198/131; 198/134
[51] Int. Cl.² .......................................... B65G 47/24
[58] Field of Search .............. 198/20 R, 31 AA, 32, 140–142, 198/134, 236, 245, 131, 182, 22 R, 22 B, 168, 172, 173, 160, 137

[56] References Cited
UNITED STATES PATENTS

| | | | |
|---|---|---|---|
| 2,652,143 | 9/1953 | Van Doren | 198/182 |
| 2,990,052 | 6/1961 | Stille et al. | 198/182 |
| 3,289,814 | 12/1966 | Rosema | 198/134 |
| 3,378,131 | 4/1968 | Weber | 198/134 |
| 3,583,544 | 6/1971 | Prodzenski | 198/245 |
| 3,677,273 | 7/1972 | Mahlstede et al. | 198/22 B |

*Primary Examiner*—James B. Marbert
*Assistant Examiner*—Joseph E. Valenza
*Attorney, Agent, or Firm*—Michael W. York

[57] ABSTRACT

Article loading apparatus including a loader for moving and loading articles in an edgewise manner into substantially vertical compartments in a moving distribution transport and a feeder for feeding a series of articles oriented in a flat, end-to-end manner into the loader. The feeder has a curved slider bed which has slots for receiving cleats of rakes that contact the articles and cause them to move along the upper surface of the slider bed. A complex arrangement of chains and sprockets drives the rakes whose ends are attached to the chains. The loader has a series of feed horns that are connected to and extend outward from a pair of rotating chains and that receive, transmit and discharge the articles onto the distribution transport.

7 Claims, 9 Drawing Figures

ARTICLE LOADING APPARATUS

BACKGROUND OF THE INVENTION

A typical requirement associated with the sortation of mail, or similar processing of documents and other articles, involves moving them in a single file past a reader or inspection station. This station may be manned by a person or else an optical or electronic image reading device, which observes on each article in succession an address or other marking, to guide later processing of the article.

The requirement to view addresses or similar information on relatively flat articles that are being transported in single file results in a relatively inefficient transport mode from the standpoint of achieving at moderate speeds a high throughout of articles per unit time. This is so because the address of the article is normally located on one of its principal planes or surfaces, and this plane must be aligned parallel to the direction of flow in order to be visible. As a consequence, at a given transport velocity, this end-to-end article arrangement results to a throughput considerably less than one wherin the principal planes of the comparatively flat articles are oriented normal to the direction of motion because in the latter case more articles can be located within a given distance. Consequently, considerably more articles can be transported per unit time when their principal planes are substantially normal to the direction of travel.

Downstream of the reading or inspection position, it is a typical practice in a sorting and distribution system to combine the above described flow of articles with those of several other identical transport lines into a single, high-throughput line. This practice makes it possible to divert all articles originating from all supply transport lines and bound for a common destination to one sort point on a single transport line rather than at, say, a number of diversion points corresponding to the number of supply transports. Prior to combining flows it is also desirable that the articles be rotated to an attitude perpendicular to motion. This permits the article inducted into the high throughput transport line to be at the close-pitched intervals required for a low transport velocity.

Systems are in existence today which perform the above described induction on mail sealed in envelopes or what is termed letter mail. One such system is the common letter sorting machine. In this system, letters are read at several reader consoles and then are transported from each console via independent paths, or supply lines, to a single distribution transport line. The letters in each supply line are on edge and in serial file, with their principal surfaces being parallel to the direction of flow. The distribuiton transport consists of a serial procession of compartmentized carriers. The compartments in each carrier are serially ordered in the direction of motion, the configuration resembling separations in a file drawer and the letters are transported therein in a manner similar to files in a file drawer when the drawer is being opened or closed.

At the end of each console supply line, occurring at a point immediately over the distribution transport circuit, letters are stopped on a ledge, standing on edge and in line with successive compartments passing below. When a pre-designated compartment passes, the letter is deflected off the ledge, giving it a velocity impulse in the direction of the transport motion. The resulting trajectory carries the letter into the targeted compartment. After the letter leaves the ledge, or induction drop point, a new letter is advanced into the position vacated, and the cycle is repeated. Because the impulse deflector in its actuated mode blocks access to this drop point, however, it must return to its initial position prior to arrival of the next letter. The induction loading dynamics is thereby characteristically reciprocal in nature.

Another type of induction system that is used to transfer letter mail onto the same distribution transport line utilizes a rotating wheel. Letters are transported, as indicated previously, on supply transports past a reading station, oriented in the previously indicated manner. At the end of each supply transport, each letter in then transferred serially into a sector, or pie-shaped compartment, of the wheel, as this compartment passes through the zenith position of rotation. Entrance is made from the side of the wheel or parallel to the wheel axis. As each compartment sector rotates through its nadir, the letter is allowed to slide out through a slot located on the cylindrical periphery of the wheel. During this exit period, the slot is tracking directly over a designated compartment in the distribution transport, and the letter falls in the designated compartment. When the next wheel sector approaches its nadir, a new distribution transport compartment is in position to receive a letter, and so on.

Because of the continuous motion circuit made by the wheel, the induction rate is much higher than for the reciprocating type of letter loader described previously. For instance, two of the wheel loaders with two supply lines will fill all compartments of the distribution transport whereas six of the reciprocating loaders, fed by six supply lines, are used to perform the same task. Other types of letter sorters known to exist have only one supply transport feeding one distribution transport; thus, the multiple induction feed concept is not involved.

Of all the types of multi-induction transport loader systems known, none will reliably handle loose-leaf articles, such as magazines, newspapers, catalogues, and similar documents. The principal need in the high-speed handling of such an article is that its one bound edge always be leading in the direction of motion of the article. Failure to observe this principle will result in flutter or general collapse of the leaves of the article. This, in turn, will variously produce jams or damage to either or both the loading apparatus and the article.

In both of the types of previously described letter loaders, there are elements of the transport circuit where the bound edge of a loose-leaf article would not be leading in the direction of motion of the article. Both types of loaders involve phases of motion where the article rides on edge. This edge must necessarily be the bound one, in order to provide coherent bearing support. The result is that the leading edge is unbound. In the case of a loose-leaved article, there is no way to guarantee that such a dynamic configuration will not lead to collapse of the pages in such a way as to cause them to be either crumpled or ripped during transit.

A further complication in this leading edge problem occurs in the wheel loader. Whereas, in the reciprocating loader, the lower edge, now the bound one, leads article motion during its trajectory into the distribution compartment, the same article in the waterwheel loader is up-ended through 180° prior to release. Thus, the bound edge would then be on top, and the loose leaves of the article will lead during the drop of the article. Such a dynamic configuration produces a great likelihood of article damage, if not also failure to transfer cleanly into the distribution transport compartment.

The present invention overcomes these problems associated with these previous systems and provides a loading apparatus which will receive articles flowing in a single, lying flat and accelerate them to the desired distribution transport speed. At the same time, the loader will rotate them to substantially a vertical attitude, thereby to assume the most efficient attitude for close pitch spacing on the distribution transport. At all times in this system, the same edge of the article will lead in the direction of motion. Thus, if the article has leaves, its leading edge will be the bound one and consequently the problems associated with previous loaders are reduced or eliminated.

BRIEF DESCRIPTION OF THE INVENTION

This invention relates to loaders and more particularly to loading apparatus for comparatively flat type articles.

It is an object of the present invention to provide a loading apparatus which is capable of being used to load a high volume of articles within a short period of time.

It is also an object of the present invention to provide a loading apparatus which is capable of handling articles that initially have their principal planes or surfaces substantially parallel to the direction of flow for the articles.

It is also an object of the present invention to provide a loading apparatus which efficiently transfers articles from a position where their principal planes or surfaces are substantially parallel to the direction of motion of the articles to an orientation where their principal planes or surfaces are substantially normal to the principal direction of motion of the articles.

It is also an object of the present invention to provide a loading apparatus which minimizes jamming probabilities.

It is also an object of the present invention to provide a loading apparatus which is capable of loading articles without subjecting the articles to damage.

It is also an object of the present invention to provide a loading apparatus which does not require complex components or precision moving parts.

It is a further object of the invention to provide a loading apparatus which is particularly adapted to postal type operations.

It is a further object of the present invention to provide a loading apparatus which is particularly suited for handling loose leaf type articles such as magazines, catalogs, folded newspapers and the like.

The present invention provides an article loading apparatus which has means for receiving a series of articles having their principal planes or surfaces located substantially parallel to their principal direction of movement and means associated with the article receiving means for reorienting the articles to permit the articles to move with their principal planes or surfaces substantially perpendicular to the principal direction of movement of the articles.

BRIEF DESCRIPTION OF THE DRAWINGS

The invention will be hereinafter more fully described with reference to the accompanying drawings in which.

BRIEF DESCRIPTION OF THE PREFERRED EMBODIMENT

Figure 1:
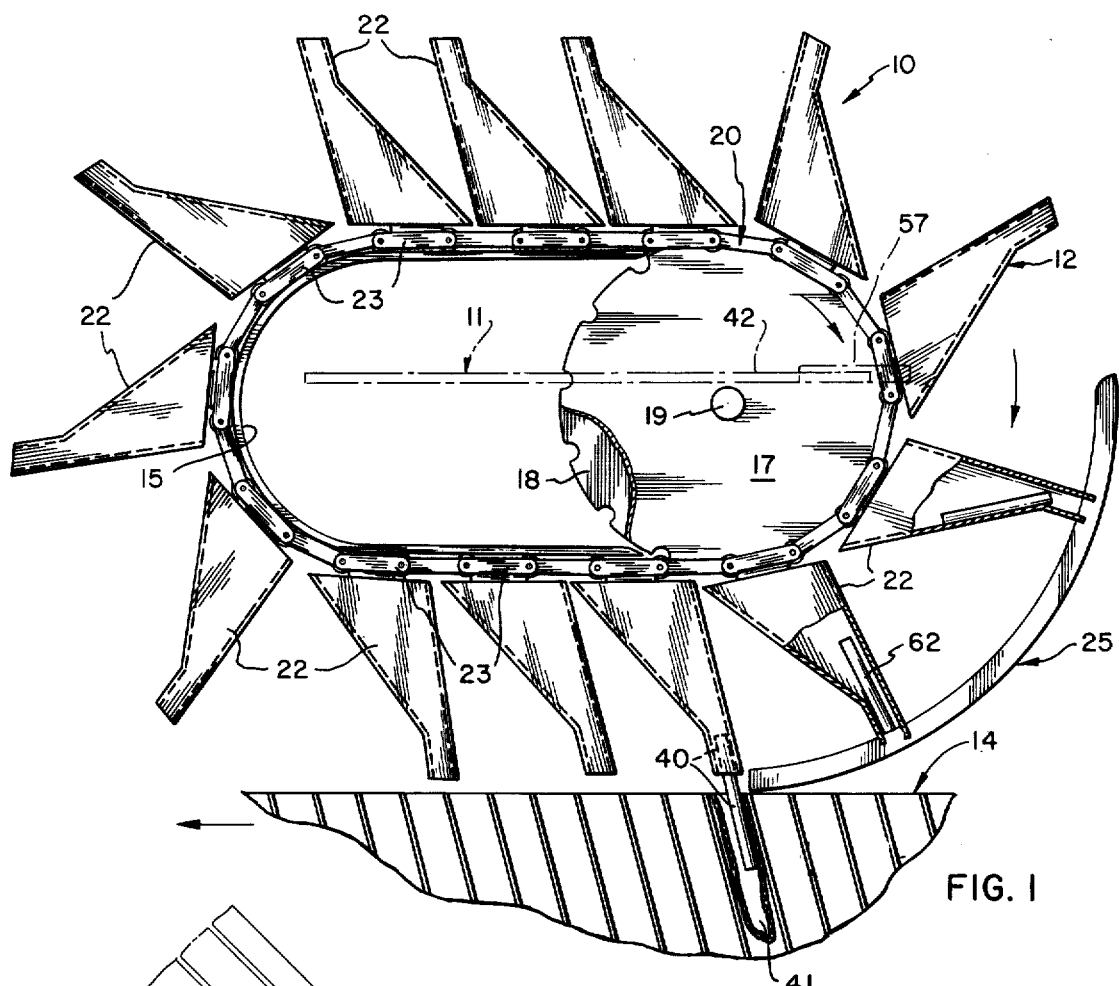
FIG. 1 is a side elevational view of the article loading apparatus of the present invention, with certain parts omitted or in phantom for clarity, illustrating it in use loading articles into a distribution transport.
Figure 2:
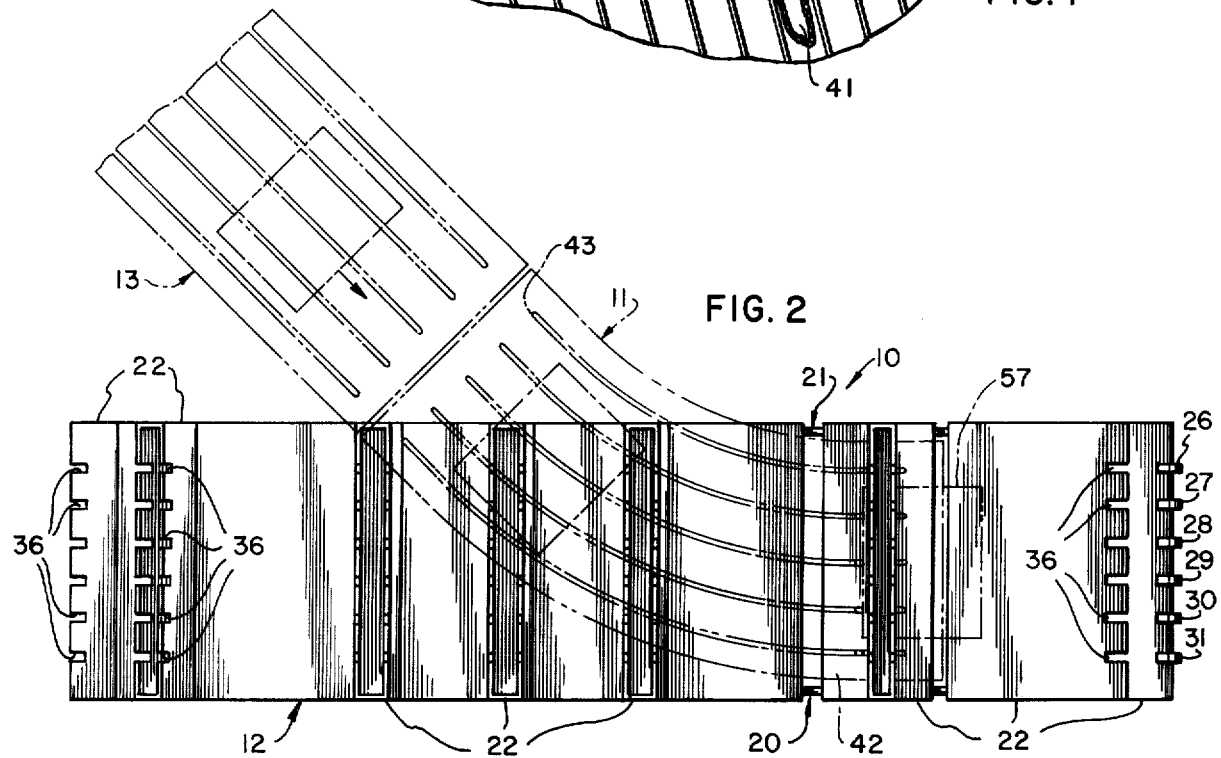
FIG. 2 is a top view of the structure illustrated in FIG. 1.

If reference is made to FIGS. 1 through 5 in the drawings it will be noted that the article loading apparatus 10 of the invention comprises a feeder 11 and a loader 12. Means for supplying a continuous, serial flow of horizontally oriented articles to the feeder 11, called a supply transport 13 and means of accepting in individual compartments the serial flow of vertically oriented articles from the end loader 12, called a distribution transport 14, are also illustrated in FIGS. 1 and 2 and are both within the state-of-the-art and do not form part of the present invention. The loader 12 comprises two horseshoe shaped chain tracks 15 and 16 which are located opposite from each other and two drive sprockets 17 and 18 which are interconnected by a shaft 19. An endless drive chain 20, which forms part of an endless conveyor, is also provided which travels in the chain track 15 and is engaged and driven by the sprocket 17. In a similar manner, another endless drive chain 21, which also forms part of an endless conveyor, is also provided which travels in the chain track 16 and is engaged and driven by the sprocket 18. The loader 12 also comprises a series of movable feed horns 22 which are connected at their inner ends to the links 23 and 24 of the respective chains 20 and 21.

A curved rail structure 25 is provided in the forward end of the loader 12 and it comprises a series of adjacent located rails or members 26, 27, 28, 29, 30 and 31 which each have a portion thereof shaped to form substantially a portion of the circumference of a circle. The rails 26, 27, 28, 29, 30 and 31 are spaced apart from each other and are fastened together by rail fastening and spacing members 32 and 33. The respective ends of the rail fastening and spacing member 32 are connected to the outer ends of horizontal link extension members 34 and 35 whose inner ends are connected to the respective chain tracks 15 and 16. The outer end of each feed horn 22 has a series of slots 36 which receive the rails 26, 27, 28, 29, 30 and 31 when the feed horn swings by the rail structure 25.

Each feed horn 22 is a generally hollow and wedge shaped receptacle with open inner and outer ends. The feed horn 22 is adapted to receive an article such as a magazine or the like through its open inner end and the rail structure 25 is adapted to temporarily hold such an article within the feed horn by blocking at least a portion of the open outer end portion of the feed horn until the feed horn sweeps past the end of the rail structure at which time the article, such as the article designated by the number 40, will be deposited in the adjacent compartment 41 of the distribution transport 14. It will, of course, be appreciated that the shaft 19 will be driven by a suitable drive means which is not shown for clarity and in view of the fact that such means are well known in the art.

As previously indicated, the article loading apparatus 10 of the present invention also comprises a curved conveyor or feeder 11 whose downstream end portion 12 extends into the interior of the loader 12. The feeder 11 has a flat horizontal slider bed 43 that curves outward from the loader 12. The slider bed 43 which has a flat upper surface has a series of curved slots 44 located extending through it. These slots 44 receive cleats 45 of a drive rake 46 which extend upward from the drive rake crossbar 47. These cleats 45 are adpated to contact a substantially flat article such as the article 63 illustrated in FIG. 3. The respective ends of the drive rake crossbar 47 are connected to a curved movable endless conveyor chain member 48 and a curved movable endless outer conveyor chain member 49. The inner or inboard chain 48, which has a lesser length than the outer chain, rides in a track 50 and is driven by inboard sprockets 51 and 52. In a similar manner, the outboard chain 49 rides in a track 53 and is engaged and driven by sprockets 54 and 55. Both the inboard sprockets 51 and 52 and the outboard sprockets 54 and 55 are driven by suitable means which are known in the art and have been omitted from the drawing for clarity.

The upstream end 56 of the feeder 11 receives articles which are supplied to it from the supply transport 13 and the cleats 44 of the adjacently located rake 46 will contact the article and cause the article to be transported along the upper surface of the slider bed 43. When the article reaches the end of the inner portion 42 of the feeder 11, it is inserted into the end of an adjacently located feed horn 22, in the manner illustrated in FIGS. 1 and 2 for the article 57. This feed horn 22 then transports the article in the manner previously indicated.

Figure 4:
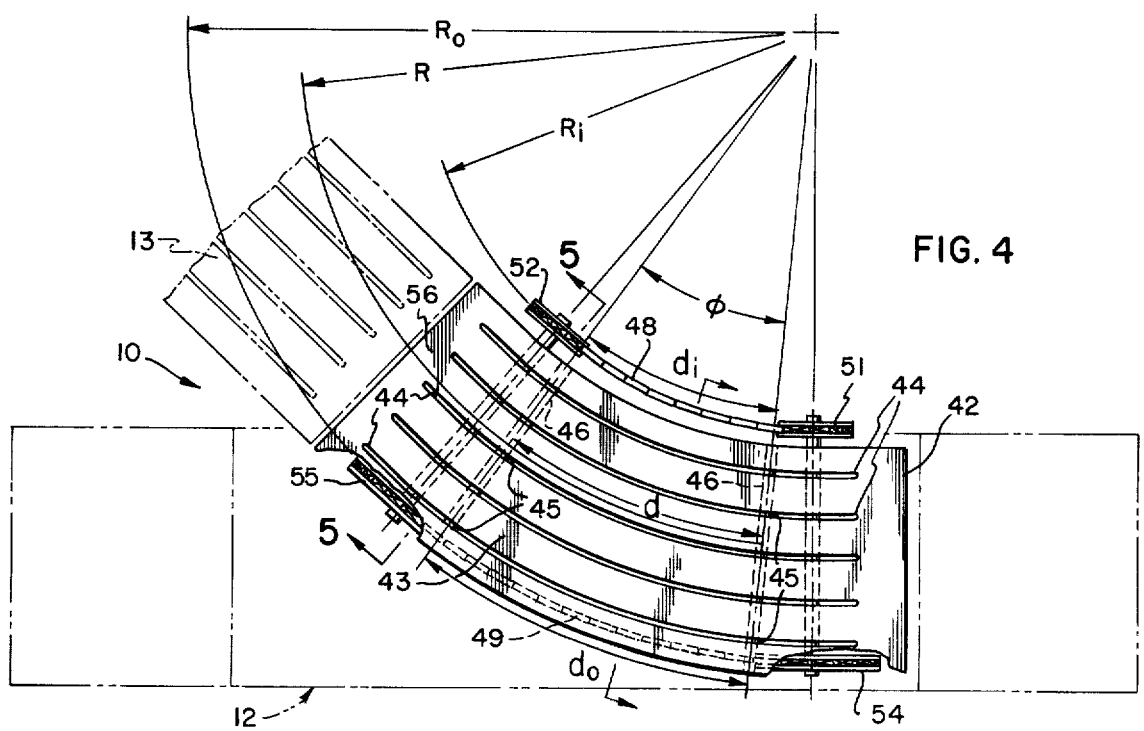
FIG. 4 is a top view of a feeder which forms part of the present invention illustrating various important parameters associated with the feeder.
Figure 5:
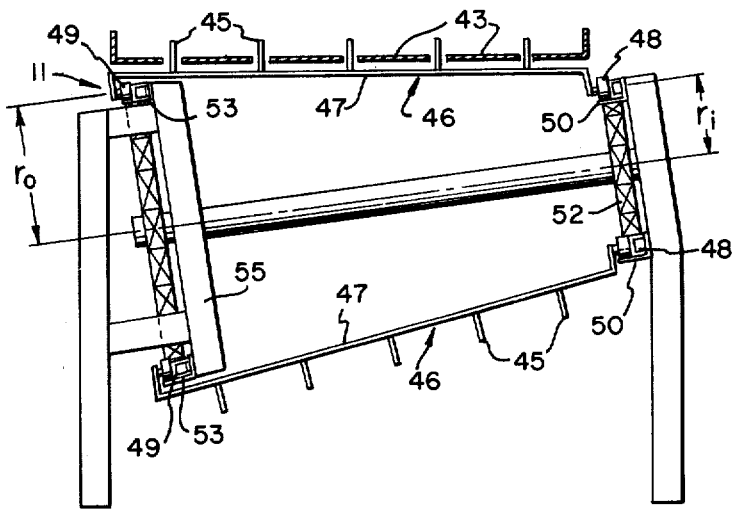
FIG. 5 is a cross sectional view taken substantially on the line 5—5 of FIG. 4, but illustrating a drive rake in both an upper and lower position on conveyor chains.

Important geometric and other parameters associated with the feeder 11 which forms part of the article loading apparatus 10 of the present invention are illustrated in FIGS. 4 and 5. As illustrated, the mean radius of the chains 48 and 49 is R and the radii of the outboard and inboard chain path or tracks on both the upper and lower circuits are $R_i$ and $R_o$. In particular, the mean radius is defined by $$R = \tfrac{1}{2}(R_o + R_i)$$

The central angle between successive rakes 46 is $\phi$, and the arc distance between rakes measured along radius R is $d$, whereby geometric definition, $$d = \phi R$$

If $d_o$ and $d_i$ are the corresponding arc intervals between rakes measured at $R_o$ and $R_i$, it is similarly true that $$d_o = \phi R_o$$
$$d_i = \phi R_i$$

As each pusher rake 46 rounds the upstream and downstream ends of the chain 48 and 49 loops, it must, to prevent binding with the chains, describe an element on a conical frustum. The two bases of the frustum are defined by the pitch radii, designated $r_i$ and $r_o$, respectively, of the inboard sprockets 51 and 52 and outboard sprockets 54 and 55. In order for this condition to occur, both ends of the rake 46 must arrive at and leave the respective sprockets at the same instant. Assuming a common angular velocity for the sprockets, this condition further dictates that the respective intervals between the rakes 46 measured at $R_o$ and $R_i$, i.e., $d_o$ and $d_i$ must exactly equal half of the pitch circumference of the corresponding sprockets. Thus:

$$d_o = \pi r_o$$
$$d_i = \pi r_i$$

Introducing the previously determined expressions for $d_o$ and $d_i$ into the above equations and solving for the respective sprocket radii, $$r_o = \frac{\phi}{\pi} R_o$$

$$r_i = \frac{\phi}{\pi} R_i$$

Since it was previously shown that $$\phi = \frac{d}{R}$$

$$= \frac{2d}{R_o + R_i}$$

it is evident by substitution that, $$r_o = \frac{2d}{\pi(R_o + R_i)} R_o$$

$$r_i = \frac{2d}{\pi(R_o + R_i)} R_i$$

showing that the sprocket radii are uniquely dictated by the choice of track radii and the distance between rakes 46. In practice, the exact dimension for $d$ will be governed by $d_o$ and $d_i$, which must be exact multiples of a standard stock chain link pitch. With d nominally fixed, then, selection of nominal values for $R_o$ and $R_i$ can be used to establish approximate sprocket pitch radii. Ultimately, the choice of the nearest commercially available sprocket radii will fix exact values for $R_o$ and $R_i$.

Figure 6:
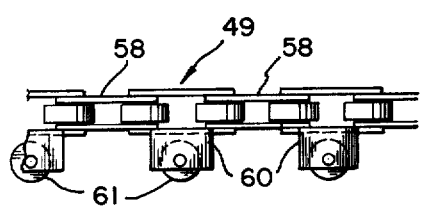
FIG. 6 is a top view of a portion of a chain which forms part of the present invention.
Figure 7:
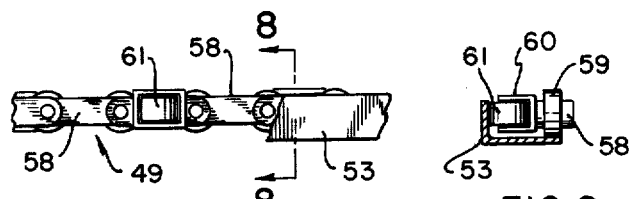
FIG. 7 is a side elevational view of the structure illustrated in FIG. 6.
Figure 8:
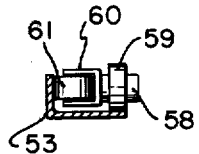
FIG. 8 is a cross sectional view taken on the line 8—8 of FIG. 7.

Important details of the chains 48 and 49 are illustrated in FIGS. 6, 7 and 8. The roller chains 48 and 49 on the inboard and outboard sides have identical pitch links. As illustrated for a portion of the chain 49, each chain 48 and 49 has links 58 upon which identical rollers 59 are rotatably mounted that contact and ride on the lower surface of the track 50 or 51 as illustrated for the track 51 in FIG. 8. Attached to each chain link 59 is a fitting 60 to which is mounted a second roller 61, orthogonal to the first roller 59, to provide lateral guidance against the inboard surface of the track 50 or 51 as the chain negotiates the curve as illustrated in FIG. 8 for the track 51. The chain is of the special commercial variety called side bow roller chain obtainable from Rex Chainbelt, Inc., of Milwaukee, Wisconsin, which accommodates side flexing, i.e., bending in the plane normal to chain wrap around the sprockets. This flexibility is sufficient to permit bending at the specified radii of curvature $R_o$ and $R_i$ in the planar portions of the chain trave. It should be noted that in view of the curved slots 44 in the slider bed 43 which accommodate the protruding rake "fingers" or cleats 45, the remaining strip of material constituting the bed surface must be supported at the upstream and downstream extremities of the bed, beyond the sweep of the rake fingers in each case by means which are known in the art and which have been omitted from the drawings for clarity.

Figure 9:
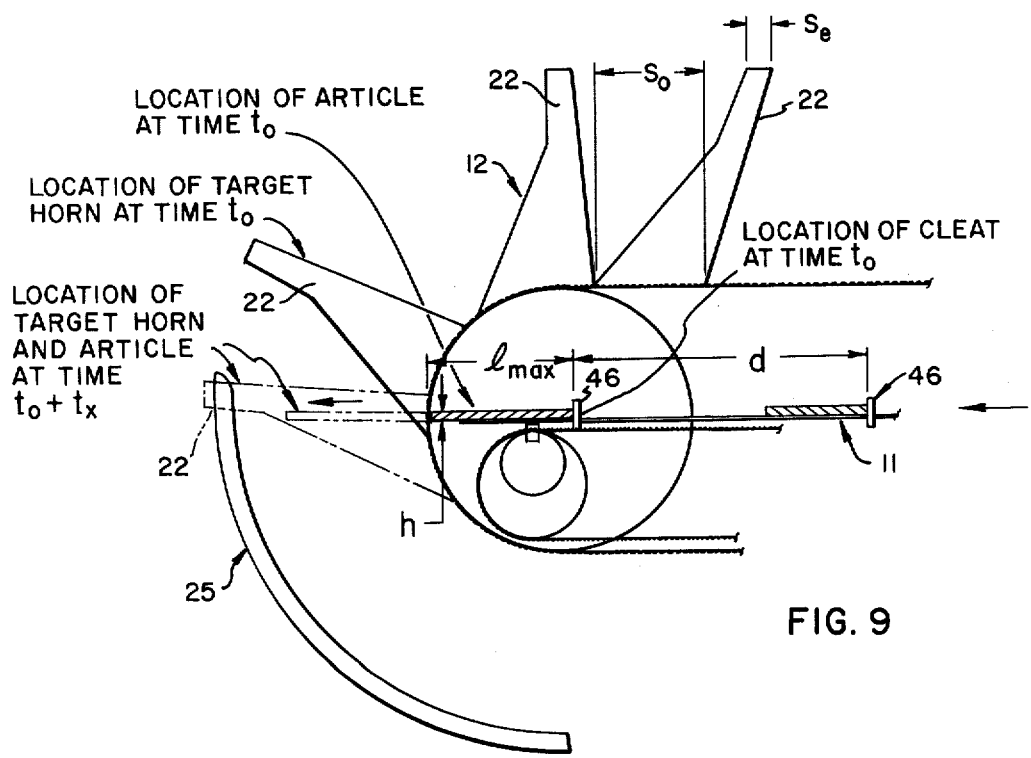
FIG. 9 is a diagramatic partial side elevational view of the present invention illustrating various dynamic relationships.

Some important dynamic and other relationships related to the feed horns 22 are illustrated in FIG. 9. It should be noted that the width of the article, i.e., its dimension crosswise to the tapering contour of the horn, can be very nearly as wide as the opening of the horn, subject only to clearance tolerances. However, the "height" dimension of the article, i.e., the one perpendicular to the feeder bed 43 when the article lies thereon is dynamically limited relative to the corresponding dimension of the intake opening of the horns 22. The "window" opening of the horn 22 available to an article entering from the feeder relates both to its height $h$, previously defined, and to its maximum possible length, $l$ max, measured along the direction of feeder 11 motion. The total loading time cycle T, between successive transfers from feeder 11 to loader 12 is identical to the time to advance the feeder rakes 46 by one rake pitch interval, $d$, and to the time to advance the horns around the loader by one horn opening interval. The time, $t_x$, required to move the maximum length article completely into the horn 22, starting from the instant of initial entry $t_o$ is then by proportion:

$$t_x = \left(\frac{l_{max}}{d}\right) T$$

During this time, the horn 22 continues to move, thereby effectively decreasing the available horn 22 opening dimension for article entry by an amount $$S_1 = \frac{t_1}{T} S_o$$

$$= \frac{l_{max}}{d} S_o$$

Hence, ignoring horn wall thicknesses, as well as provision for construction and dynamic tolerances, the maximum permissible article height is:

$$h_{max} = S_o - S_1$$
$$= S_o \left[1 - \frac{l_{max}}{d}\right]$$

This implies the geometry is governed by the assumed coincidence of maximum article height and length in at least one element of the population being processed. One additional, obvious constraint will be noted here, namely that the reduced dimension of the horn 22 opening at the output end, $S_e$, must also clear the article height previously defined. Thus:

$$S_e > S_o \left[1 - \frac{l_{max}}{d}\right]$$

It is also evident that the corresponding pitch of compartments in the transport 14 can theoretically be as small as $S_e$. Hence, the ratio N between the throughputs of compartments in the transport 14 and loading horns 22 on the article loading apparatus 10 can be as great as:

$$N = \frac{S_o}{S_e}$$

With this in mind, it is evident that the number of article loading apparatus 10 needed to fill every compartment of the transport 14 can be as great as N. By virtue of this arrangement, it is possible for articles to be supplied, lying flat for inspection reading or other identification, on a series of N supply transports, each having a throughput Q. If each file of articles is fed into a separate loading apparatus 10, it is possible now to combine the separate lines of flow into a single transport 14 with the maximum throughput NQ.

Moreover, by virtue of inverting each article to a vertical orientation, its minor dimension, or height, $h$, rather than one of its major dimensions, length or width, now limits the ultimate minimum pitch between articles in the direction of flow of the transport 14. It is therefore possible to obtain the minimum possible transport 14 velocity for a throughput NQ. This minimizes the criticality of dynamics in loading the transport 14, as well as of later diversion of articles from the moving transport at various points along its circuit.

In order to use the article loading apparatus 10 of the present invention, it is located in such a manner that the outer end of the slider bed 43 of the feeder 11 abuts the end of a conventional supply transport 13 and in such a manner that the outer ends of the feed horns 22 pass directly over the openings in the compartments of a conventional distribution transport 14. Articles, such as magazines and the like, then are fed by the supply transport 13 with their principal planes or surfaces located substantially parallel to their direction of movement, after their labels, etc. had been viewed by suitable means known in the art, onto the outer end of the slider bed 43 of the feeder 11 where the cleats 45 of the rakes 46 contact the aft edges of the articles and move them along the upper surface of the slider bed. The series of articles are moved by the cleats 45 to the inner end of the slider bed 43, where an article is pushed into the inner open end of an adjacently located feed horn 22 in the manner indicated in FIG. 1 for the article designated by the number 57.

Figure 3:
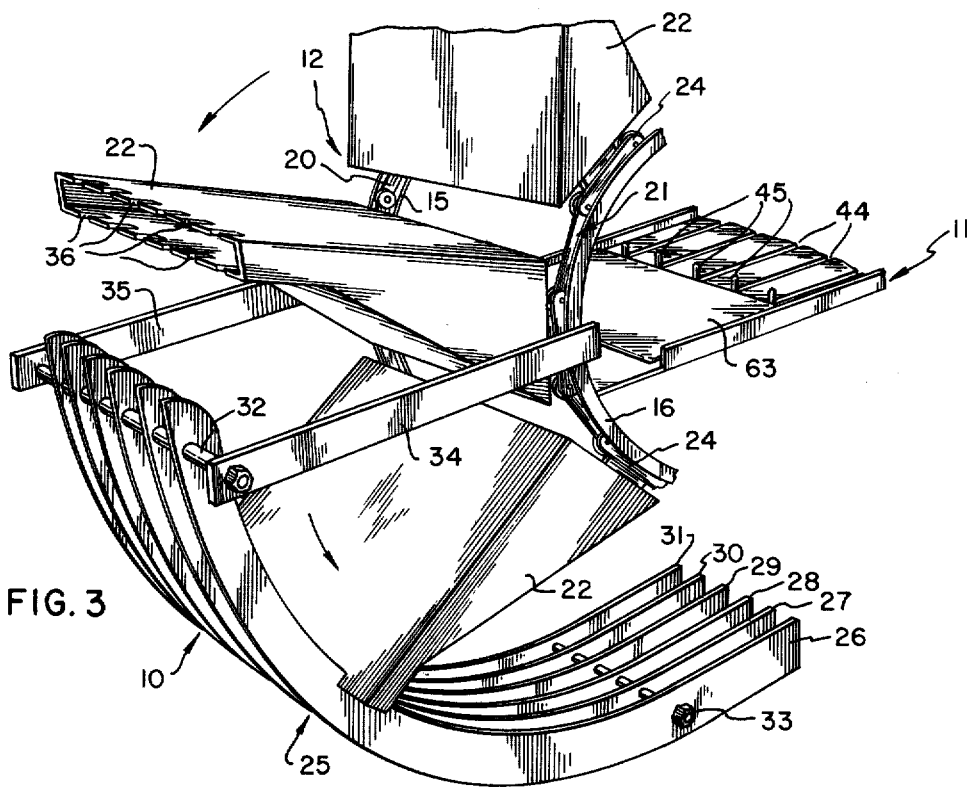
FIG. 3 is a perspective view of a portion of the structure illustrated in FIGS. 1 and 2.

The feed horn 22 then moves downward as indicated by the arrows in FIGS. 1 and 3 as a result of movement of the chains 16 and 17 and the article, as indicated for the article designated by the number 62 in FIG. 1, is kept in the feed horn by the rail structure 25. When the feed horn 22 moves around so that its outer end is no longer blocked by the rail structure 25, the article slides out of the feed horn due to gravity and into the adjacent compartment of a transport 14 in the manner indicated in FIG. 1 for the article 40 and the compartment 41. As a consequence, the loader 12 reorients the articles received from the associated feeder 11 to permit the articles to move with their principal planes or surfaces substantially normal to the principal direction of movement of the articles which is also the direction of movement of the transport 14. The loader 12 also insures that the same edge of an article, namely the edge it receives which is first inserted into the inner open end of the feed horn 22, will always lead when the article is subjected to edgewise movement by the loader. In order to utilize the full capacity of the distribution transport 14, normally a number of article loading apparatus 10 will load the same transport 14 in the previously indicated manner.

For proper operation, it will be appreciated that the movement of the chains 15 and 16 must be properly synchronized, through means known in the art, with the movement of the distribution transport 14 so that the feed horns 22 move at approximately the same speed as the compartments of the transport as the articles are to drop into the compartments. Furthermore, the chains 15 and 16 must also be synchronized so that the open outer ends of the feed horns 22 are located substantially above the opening of the compartment in the transport as article transfer takes place. In a similar manner, movement of the rakes 46 and the supply transport 13 must be properly synchronized with the movement of the chains 15 and 16 through means known in the art so that the articles are properly fed into the inner open ends of the feed horns 22.

It will be appreciated that certain supporting and connecting structures have been omitted from the drawings since such structures are conventional and are well known in the art.

Since only one edge of an article is oriented toward the direction of article movement when the article is being transmitted in an edgewise manner with the article loading apparatus of this invention, the invention is particularly suited for loading magazines and other articles that have unbound edges and which need to be translated with their bound edge first to prevent page flutter and possible jamming.

Although the invention has been described in considerable detail with reference to a preferred embodiment, it will be understood and appreciated that variations may be made within the spirit and scope of the invention as defined in the appended claims.

What is claimed is:

1. Article loading apparatus comprising first endless conveying means for feeding articles having at least one endless movable member, means associated with said first endless conveying means for driving said first endless conveying means, a plurality of outward projecting feed horns attached to the endless movable member of said first endless conveying means, said feed horns having a hollow interior with an open inner end portion adjacent to said endless movable member and an open outer end portion, means located in the path of said projecting feed horns for blocking at least a portion of the open outer end portions of said feed horns, said blocking means terminating at a location for permitting said articles to pass out of the open outer end portion of said feed horns due to gravity, second endless conveying means having one end thereof located within the interior of said first endless conveying means at a location adjacent to the path of the inner open end portions of said feed horns for feeding articles into the inner open end portion of said feed horns in a substantially horizontal direction, said second endless conveying means being curved to convey articles in a curved path, and means for driving said second endless conveying means.

2. The article loading apparatus of claim 1 wherein said second endless conveying means comprises two curved movable endless members spaced apart from each other and a plurality of spaced cross members each having one end connected to one curved movable endless member and the other end thereof connected to the other curved movable endless member.

3. The article loading apparatus of claim 2 further comprising a member having a flat surface associated with said second endless conveying means and article contacting means associated with said cross members for contacting and pushing articles along said flat surface.

4. The article loading apparatus of claim 3 wherein said contacting means comprise cleat members extending from said cross members and wherein said flat surfaced member has slots for receiving said cleat members.

5. The article loading apparatus of claim 2 wherein said curved movable endless members each comprise a chain with one set of rollers and with another set of rollers oriented orthogonal to the first set of rollers.

6. The article loading apparatus of claim 2 wherein said means for blocking at least a portion of the open outer end portions of said feed horns comprises a plurality of curved members and the outer end portions of said feed horns have a plurality of slots for receiving said curved members.

7. The article loading apparatus of claim 2 wherein the open inner end portions of said feed horns are larger than the open outer end portions of said feed horns.

* * * * *